United States Patent [19]

Muller

[11] Patent Number: 4,667,879

[45] Date of Patent: May 26, 1987

[54] THERMOPLASTIC MATERIAL APPLICATOR HAVING AN ADJUSTABLE SLOT NOZZLE

[75] Inventor: Peter E. Muller, Reinach, Switzerland

[73] Assignee: Nordson Corporation, Amherst, Ohio

[21] Appl. No.: 767,745

[22] Filed: Aug. 21, 1985

[51] Int. Cl.$^4$ ............................................. B05B 1/24
[52] U.S. Cl. .................................. 239/133; 118/113; 118/411; 239/563; 239/569; 239/597
[58] Field of Search .............................. 239/597–599, 239/132, 135, 133, 563, 569, 451, 455; 118/113, 466; 425/25, 410, 411

[56] References Cited

U.S. PATENT DOCUMENTS

| Re. 27,865 | 1/1974 | Baker et al. |
|---|---|---|
| 545,769 | 9/1895 | Bowman ........................ 251/209 |
| 2,295,682 | 9/1942 | Oliver . |
| 3,106,481 | 10/1963 | Sorg ........................ 118/411 X |
| 3,116,857 | 1/1964 | Lehman et al. . |
| 3,145,419 | 8/1964 | Reifenhauser ........................ 425/466 |
| 3,182,867 | 5/1965 | Barosko et al. ........................ 239/563 X |
| 3,227,136 | 1/1966 | Bartlett et al. . |
| 3,322,593 | 5/1967 | Conti ........................ 239/133 X |
| 3,435,804 | 4/1969 | Orlowski . |
| 3,595,204 | 7/1971 | McIntyre et al. . |
| 3,938,468 | 2/1976 | Kirschner ........................ 239/597 X |
| 4,119,058 | 10/1978 | Schmermund . |
| 4,281,619 | 8/1981 | Frick et al. . |
| 4,405,063 | 9/1983 | Wydro et al. . |
| 4,466,378 | 8/1984 | Rogers et al. ........................ 118/411 |

Primary Examiner—Andres Kashnikow
Assistant Examiner—Daniel R. Edelbrock
Attorney, Agent, or Firm—Wood, Herron & Evans

[57] ABSTRACT

A valved flow control dispenser including a slot nozzle through which molten thermoplastic material is dispensed onto a substrate. The slot nozzle includes a nozzle body within which there is a transverse cylindrical bore, which bore is intersected by two spaced radial openings. One of these openings is in fluid communication with a pressurized source of molten thermoplastic material, and the other opening is in fluid communication with a slotted discharge opening of the nozzle. A cylindrical flow control member having a groove provided in its exterior surface is rotatably mounted within the bore. This groove is of varying width and provides a flow path for molten thermoplastic material between the openings in the bore. By varying the rotatable orientation of the cylinder relative to the openings, the width of molten material dispensed from the slotted discharge openings of the nozzle may be varied.

7 Claims, 4 Drawing Figures

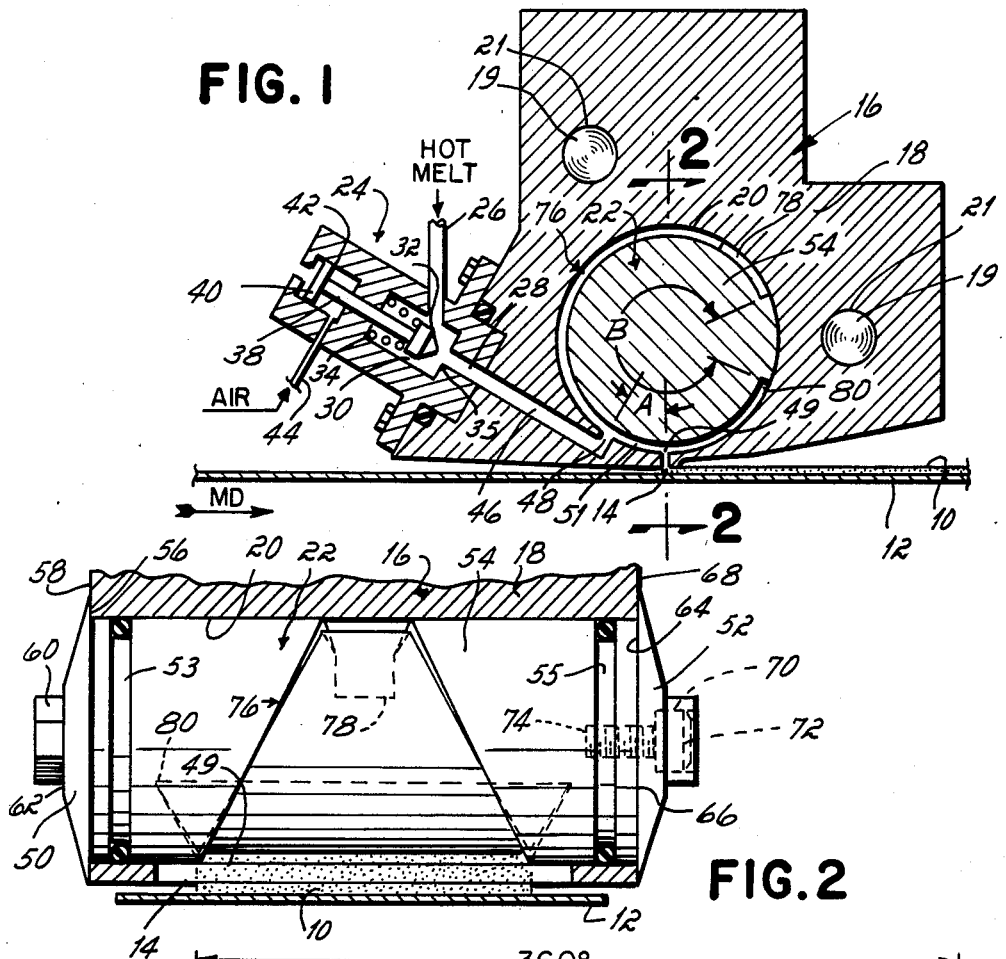
FIG. 1
FIG. 2
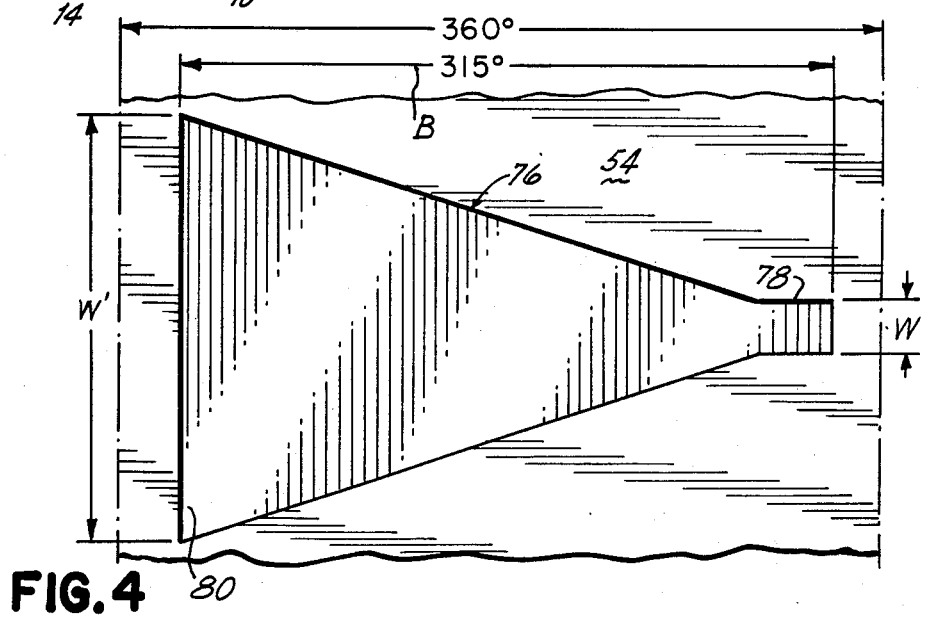
FIG. 4

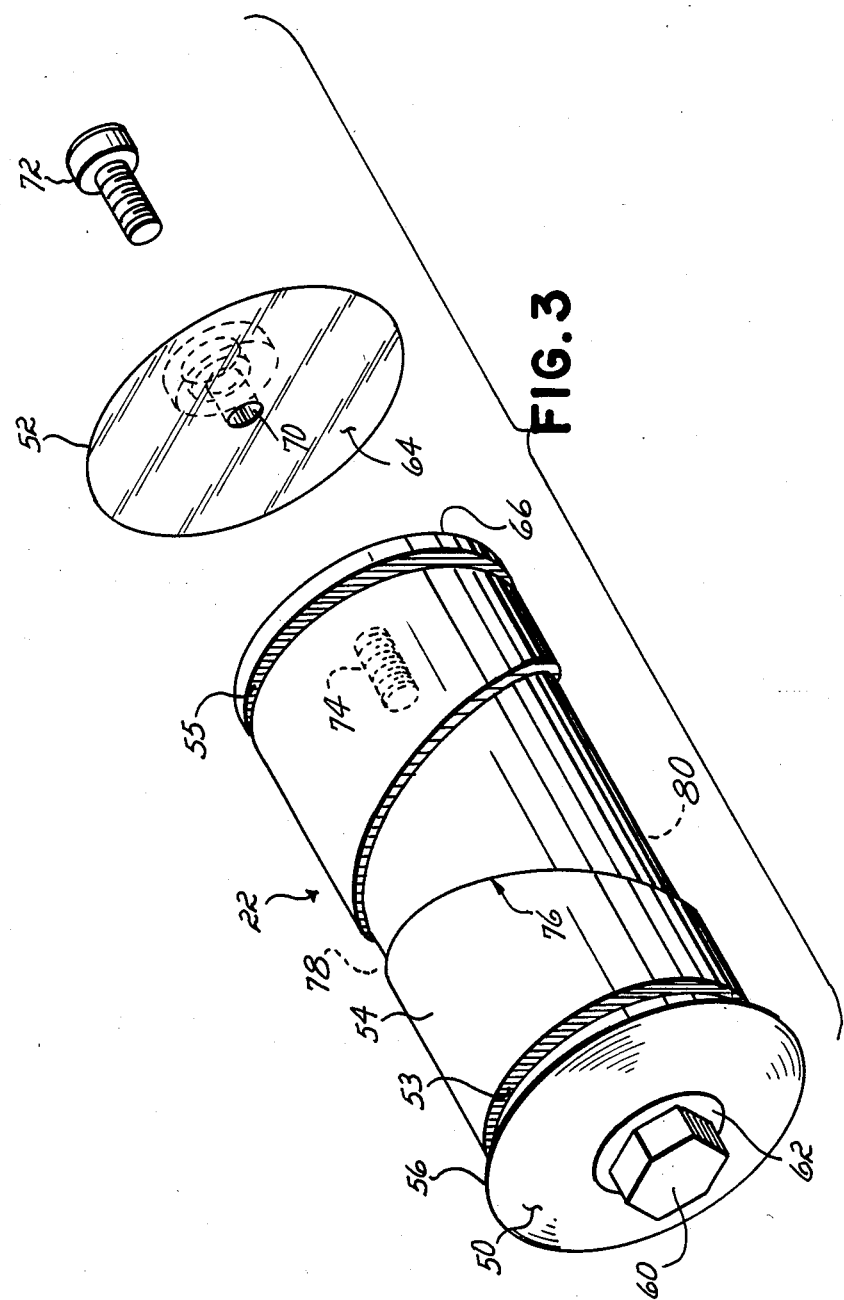

THERMOPLASTIC MATERIAL APPLICATOR HAVING AN ADJUSTABLE SLOT NOZZLE

This invention relates to thermoplastic applicator systems and more particularly to an apparatus for applying wide patterns of molten thermoplastic material to a substrate.

Molten thermoplastic materials, or so-called "hot melt" materials, are applied to substrates by melting the material, which is generally solid at room temperature, and then conveying it in a molten state to a dispenser from which it is applied to the substrate. The configuration of the nozzle orifice of the dispenser determines the pattern of the material applied to the substrate. When the desired pattern is a relatively wide one, as for example when covering a wide web of material, the nozzle generally has a wide, narrow orifice for dispensing the molten material. Such nozzles are commonly known as "slot nozzles," examples of which are to be found in U.S. Pat. Nos. 2,295,682; 3,227,136; and 3,595,204.

Many nozzles or applicators for applying hot melt material to various substrates include a valve for controlling and establishing intermittent flow of the thermoplastic material from the outlet orifice of the nozzle. One such appropriate intermittent control valve is disclosed in U.S. Pat. No. 3,595,204.

One limitation of all slot nozzle applicators, whether or not the applicator included a valve for controlling flow from the nozzle, has been the difficulty of changing from one pattern to another. In general, each applicator has been capable of applying only a single pattern of thermoplastic material to a substrate. If a different pattern, as for example a different width pattern, was desired, it has heretofore either been necessary to change the complete nozzle or to disassemble the nozzle and insert shims to block a portion of the outlet orifice of the nozzle. Consequently, whenever a pattern of hot melt adhesive or molten thermoplastic material was to be changed, the applicator system was required to be shut down for either disassembly or replacement of the nozzle portion of the apparatus. That disassembly or replacement of the nozzle usually required readjustment of the complete system to obtain the desired flow rate, hot melt material thickness, etc., after replacement or disassembly of the nozzle.

It has therefore been an objective of this invention to provide an improved applicator, including an improved slot nozzle, which readily and easily accommodates varying patterns of molten thermoplastic material dispensed from the nozzle of the system.

Still another objective of this invention has been to provide an improved slot nozzle applicator system wherein the pattern of adhesive dispensed from the system may be very quickly, easily and inexpensively changed or varied without the need for disassembly or replacement of any of the parts of the system and particularly without the need for disassembly or replacement of the nozzle portion of the system.

The apparatus of this invention which accomplishes these objectives comprises a valved flow control dispenser through which molten thermoplastic material is supplied to a slot nozzle. The slot nozzle includes a nozzle body within which there is a transverse cylindrical bore, which bore is intersected by two spaced radial openings into the bore. One of these openings is in fluid communication with a pressurized source of molten thermoplastic material and the other opening is in fluid communication with the slotted discharge opening of the nozzle. Within the bore there is a cylindrical flow control member having an arcuately shaped groove provided in its exterior surface. This groove cooperates with the cylindrical bore to provide a flow path for molten thermoplastic material between the openings in the bore. The peripheral groove is of varying transverse width about the periphery of the cylinder so that by varying the orientation of the cylinder relative to the openings, the width of molten material dispensed from the slot opening of the nozzle may be varied.

The advantage of this slotted nozzle and the applicator system incorporating this nozzle is that it enables the pattern of material applied by the slot nozzle to be varied by simply changing the angular orientation of the rotatable cylinder of the slot nozzle relative to the valve body. This results in a different width flow passage in the periphery of the cylinder being aligned with the slotted orifice of the nozzle and in a change of width of molten thermoplastic material dispensed from the nozzle.

These and other objects and advantages of this invention will be more readily apparent from the following description of the drawings in which:

FIG. 1 is a partially diagrammatic, cross sectional view of a slot nozzle applicator system incorporating the invention of this application.

FIG. 2 is a cross sectional view taken on line 2—2 of FIG. 1.

FIG. 3 is an exploded perspective view of the rotatable cylinder portion of the adjustable slot nozzle of FIGS. 1 and 2.

FIG. 4 is a developed view of the face of the cylinder of FIGS. 1 and 2.

The invention of this application is intended to apply a coating 10 of molten thermoplastic material or so-called "hot melt" material to a moving web 12 as that web moves on a conveyor (not shown) past an outlet orifice 14 of a slot nozzle 16. The slot nozzle 16 comprises a nozzle body 18 having a transverse bore 20 extending therethrough. This bore cooperates with a rotatably adjustable cylinder 22 mounted therein to form a flow path for hot melt material supplied from a valved dispenser 24 to the outlet orifice 14 of the slot nozzle 16, as explained more fully hereinafter.

The valved dispenser 24 is a conventional pneumatically controlled dispenser for controlling the flow of molten material from an inlet conduit 26 of the dispenser to an outlet port 28. The dispenser includes an internal chamber 30 communicating with the inlet conduit 26 and the outlet port 28. A valve 32 is located within this chamber 30 and is biased by a spring 34 into a closed position relative to a valve seat 35 of the dispenser. The valve 32 is secured to one end of a valve stem 38, the opposite end of which terminates in a piston 40 movable within a cylinder bore 42. Movement of the piston 40 within the cylinder 42 is controlled by air pressure supplied through an air line 44 to the underside of the piston. Air pressure supplied to the underside of this piston is operative to move the piston against the bias of the spring 34 and thereby lift the valve 32 off of the seat 35. So long as the valve is off of the seat 35, molten hot melt material is free to flow from a pressurized source (not shown) of the hot melt material, through the conduit 26, the chamber 30, and the outlet port 28 of the dispenser to an inlet passage 46 of the slot nozzle 16. This inlet passage 46 interconnects the outlet of the valved dispenser 24 to an inlet port 48 of the nozzle body 18, which inlet port opens into the cylindrical bore 20.

The rotatable flow control cylinder 22 is mounted within the cylindrical bore 20 of the valve body 18. This cylinder 22 has a flange 50 formed on one end and a cap 52 bolted to the opposite end so as to secure the cylinder within the bore 20.

With reference to FIGS. 2 and 3, it will be seen that the flange 50 is formed integral with the cylindrical body 54 of the flow control cylinder 22. This flange extends radially beyond the periphery of the bore 20 in the nozzle body 16 and has a shoulder or face 56 which abuts against the end wall 58 of the nozzle body 16. A hexagonal-shaped hub 60 extends from the opposite face 62 of the flange 50.

The cap 52 is configured similarly to the flange 50 but bolts to the cylinder body 54 rather than being formed integrally with it. This cap 52 has an inside wall 64 which abuts against the end wall 66 of the cylindrical section 54 of the cylinder 22 and against the end wall 68 of the nozzle body 16. An axial bore 70 extends through the cap 52 and is counterbored for reception of the head of a bolt 72. This bolt passes through the cap 52 and is threaded into a threaded bore 74 of the cylinder 22.

The cylinder 22 is assembled to the nozzle body 16 by insertion of the cylindrical section 54 of the cylinder 22 into the bore 20 until the shoulder 56 of the flange 50 abuts against the end face 58 of the nozzle body 16. The cap 52 is then bolted onto the end 66 of the cylindrical section 54 of the cylinder 22. The length of the cylindrical section 54 of the cylinder 22 is slightly less than the length of the bore 20 so that securement of the cap 52 onto the cylinder and tightening of the bolt 72 has the effect of frictionally securing or locking the cylinder 22 against rotational movement within the bore. To adjust the angular position of the cylinder 22 within the bore 20, the bolt 72 is loosened and the hexagonal-shaped hub 60 on the end of the cylinder remote from the cap 52 is grasped by a tool or wrench and rotated. When the cylinder 22 is in a desired rotational position, the bolt 72 is tightened so as to lock the cylinder in the newly adjusted rotational position.

A pair of annular grooves 53, 55 are provided in the outer ends of the cylindrical section 54 of the cylinder 22. Conventional O-rings are mounted in these grooves so as to form seals between the cylinder 22 and the bore of the body 18 of the nozzle.

Formed or machined in the peripheral surface of the cylinder 22 there is groove 76. In FIG. 4, the configuration of this groove is developed over the full 360° of the periphery of the cylinder 22. In general, this groove 76 tapers from a fixed width narrow end section 78 to a wide end section 80.

The groove 76 cooperates with the internal surface of the bore 20 to define a flow path for molten adhesive between the inlet opening 48 in the bore and an outlet opening 49 to the slotted discharge orifice 14. The angle A between these openings 48 and 49 represents only a small portion or fraction of the angle B over which the groove 76 in the cylinder 22 extends. In one preferred embodiment, the angle A is approximately 30° and the angle B is approximately 315°. The purpose of this difference is to accommodate adjustment of the width of the groove 76 aligned with the outlet orifice 14 of the slot nozzle 16. By rotating the cylinder 22 relative to the openings 48, 49, the width of the slot 76 aligned with the outlet port 49 and outlet orifice 14 is varied. Thereby, the width of the molten material dispensed from the outlet orifice 14 and applied to the web 12 is varied. Thus, when the narrow end section 78 of the groove is aligned with the outlet orifice 14 of the nozzle 16, a very narrow band of molten material of approximately the same width as the width W of the groove 76 is applied to the web 12. Alternatively, when the cylinder is adjusted so as to align a wide section W' of the groove 76 with the outlet orifice or slot 14 of the nozzle, a wide pattern of hot melt material is applied to the web 12.

In the preferred embodiment of the invention the slot nozzle body is maintained in a heated condition by heater cartridges 19 mounted within bores 21 of the body 18 of the slot nozzle. These heater cartridges are electrically heated under the control of a thermostat (not shown) mounted within the body 18 of the nozzle.

In the use of the applicator 14, molten thermoplastic material is supplied under high pressure to the conduit 26 and through that conduit to the valved dispenser 24. When the valve 32 of that dispenser 24 is opened by high pressure air supplied through the conduit 44 to the dispenser, molten thermoplastic material flows through the dispenser into the inlet passage 46 of the slot nozzle 16. That molten material then flows through the inlet passage 46 and the inlet port 48, through the passage 51 defined by the groove 76 to the outlet port 49 and the outlet orifice 14. That molten thermoplastic material is then deposited as a wide laminate 10 of thermoplastic material onto the top of web 12 as the web 12 passes beneath the nozzle. That molten material will continue to flow in the conduit 26 and through the valved dispenser 24 to the outlet orifice 14 of the slot nozzle 16 so long as the valve 32 of the dispenser 24 remains open. When that valve 32 is closed, flow through the slot nozzle 16 will be terminated or interrupted for so long as the valve 32 remains closed.

In the event that there is a need or desire to change the width of thermoplastic material flowing from the nozzle, the bolt 72 is loosened and the hexagonal-shaped hub 60 on the end of the cylinder 22 rotated so as to align a desired width section of the groove 76 with the outlet opening 49 in the bore 20 of the slotted nozzle 16. This adjustment may be made while the valve 32 of the dispenser 24 remains open. When the desired width of pattern is being dispensed from the orifice 14 and applied to the web 12, the bolt 72 may then be tightened so as to lock the cylinder 22 in the newly adjusted position.

While I have described only a single preferred embodiment of my invention, persons skilled in this art will appreciate numerous changes and modifications which may be made without departing from the spirit of my invention. For example, a continuous flow path may be established from the otherwise "dead" ends of the groove 76—located outside the flow path 51 between the openings 48 and 49 in the slot nozzle 16—and the source of hot melt material to the valved dispenser 24. The provision of such a return flow path to the source of hot melt material may be necessary in the case of certain particular hot melt materials which are prone to charring or burning when subjected to heat over a prolonged period of time. Furthermore, a motor, such as an electrical stepping motor, rather than a hand tool, may be used to angularly adjust the cylinder 22 in the bore 20. Other changes and modifications will also be readily apparent to persons skilled in this art. Therefore, I do not intend to be limited except by the scope of the following appended claims.

Having described my invention, I claim:

1. An adjustable slot nozzle for use in combination with a valved supply of molten thermoplastic material, said nozzle comprising
   a nozzle body provided with a transverse cylindrical bore,
   a radially disposed supply opening in the wall of said bore, said supply opening being in fluid communication with a molten material supply passage in said body,
   said supply passage being adapted to be connected to a valved source of molten thermoplastic material,
   a radially disposed discharge slot opening in the wall of said bore, said discharge slot opening in the wall of said bore being in fluid communication with a discharge slot opening in said nozzle body through which molten thermoplastic material is dispensed from said nozzle, and
   a cylindrical flow control member rotatably mounted in said bore, said cylindrical flow control member having an arcuately shaped peripheral groove provided in its exterior surface, said peripheral groove and said bore cooperating to provide a flow path for molten thermoplastic material between said supply opening in said bore and said discharge slot opening in said bore, and
   said peripheral groove in said flow control member being of varying transverse width about the periphery of said flow control member, said peripheral groove being of substantially greater arcuate length about the periphery of said flow control member than the arcuate distance between said openings such that said flow control member may be reoriented relative to said openings in said bore to vary the width of molten material dispensed from said slot opening of said nozzle,
   said cylindrical flow control member having a flange formed on one end thereof, said flange being engageable with one end face of said nozzle body, and a cap removably received on the opposite end of said cylindrical flow control member, said cap having a surface engageable with the opposite end face of said nozzle body such that said cap, when tightened onto said cylindrical flow control member, is operative to frictionally lock said cylindrical flow control member in an angular position of adjustment within said bore.

2. The nozzle of claim 1 wherein said nozzle body has at least one heater receiving bore therein, and
   an electrical resistance cartridge heater mounted in said bore.

3. The dispenser of claim 1 wherein said cylindrical flow control member has means formed on said one end thereof for adjusting the angular position of said cylindrical flow control member within said bore.

4. The dispenser of claim 3 wherein said adjustment means comprises a hub formed on said one end of said cylindrical flow control member, said hub having flats formed thereon.

5. A molten thermoplastic dispenser comprising
   a nozzle body,
   a valve body including a cylinder,
   a piston movable within said cylinder,
   a valve stem connected at one end of said piston, the opposite end of said stem terminating in a flow control valve, said valve cooperating with a valve seat to control the flow of molten thermoplastic material from a source of said molten material to a supply passage in said nozzle body,
   said nozzle body being provided with a transverse cylindrical bore,
   a radially disposed supply opening in the wall of said bore, said supply opening being in fluid communication with said supply passage in said nozzle body,
   a radially disposed discharge slot opening in the wall of said bore, said discharge slot opening in the wall of said bore being in fluid communication with a discharge slot opening in said nozzle body through which molten thermoplastic material is dispensed from said discharge slot opening in said nozzle body,
   a cylindrical flow control member rotatably mounted in said bore, said cylindrical flow control member having an arcuately shaped groove provided in its peripheral surface, said peripheral groove and said bore cooperating to provide a flow path for molten thermoplastic material between said supply opening in said bore and said discharge slot opening in said bore,
   said peripheral groove in said flow control member being of varying transverse width about the periphery of said flow control member, said peripheral groove being of substantially greater arcuate length about the periphery of said flow control member than the arcuate distance between said openings such that said flow control member may be reoriented relative to said openings in said bore to vary the width of molten material dispensed from said discharge slot opening of said nozzle body, and
   said cylindrical flow control member having a flange formed on one end thereof, said flange being engageable with one end face of said nozzle body, and a cap removably received on the opposite end of said cylindrical flow control member, said cap having a surface engageable with the opposite end face of said nozzle body such that said cap, when tightened onto said cylindrical flow control member, is operative to frictionally lock said cylindrical flow control member in an angular position of adjustment within said bore.

6. The dispenser of claim 5 wherein said cylindrical flow control member has means formed on said one end thereof for adjusting the angular position of said cylindrical flow control member within said bore.

7. The dispenser of claim 6 wherein said adjustment means comprises a hub formed on said one end of said cylindrical flow control member, said hub having flats formed thereon.

* * * * *